Figure 1:
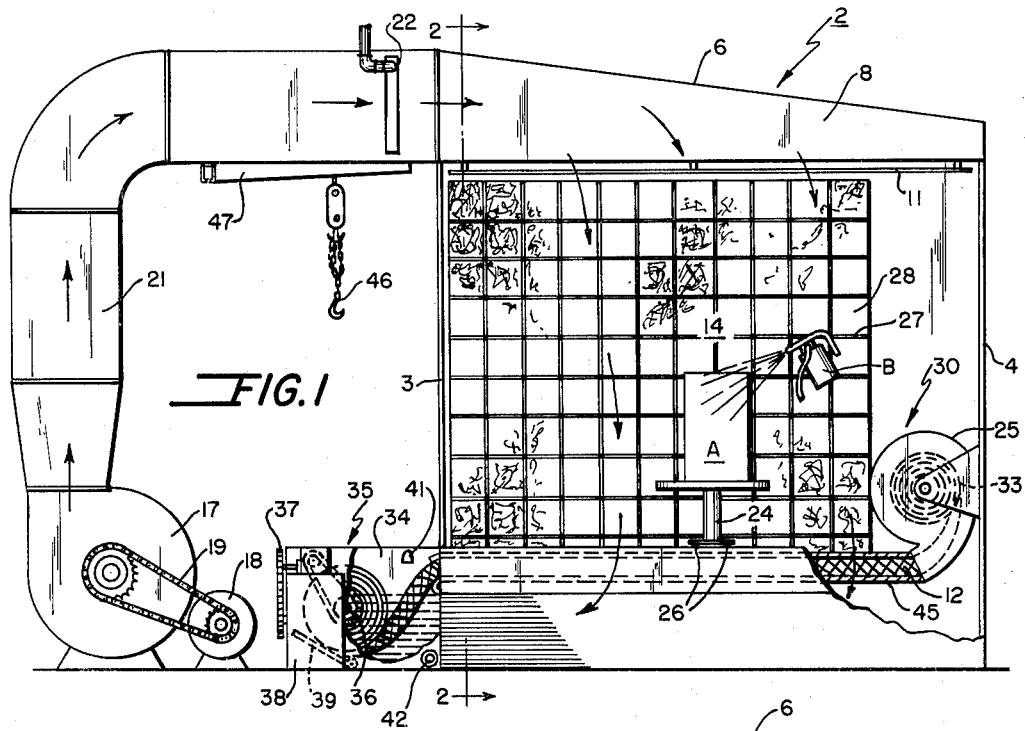

May 24, 1966  T. R. SMITH  3,252,401
PAINT SPRAY BOOTH APPARATUS AND METHOD
Filed Dec. 22, 1961

INVENTOR.
TOM R. SMITH
BY
Ralph B. Grick
ATTORNEY 3,252,401
PAINT SPRAY BOOTH APPARATUS AND METHOD
Tom R. Smith, Louisville, Ky., assignor to American Air Filter Company, Inc., Louisville, Ky., a corporation of Delaware
Filed Dec. 22, 1961, Ser. No. 161,564
7 Claims. (Cl. 98—115)

The present invention relates to paint spray booths and more particularly to an improved paint spray booth apparatus and an improved method of removing paint overspray from a paint spray booth.

In the art of paint spraying, wet booths or water curtain types of paint spraying systems have been used to capture paint overspray in article painting operations. These systems have required expensive, comparatively complex equipment and have been difficult to maintain and operate efficiently. Further, these systems have required large volumes of water and the concomitant costly power for appropriate circulation of such large water volumes. In an effort to avoid the aforedescribed problems, paint overspray arrangements have been used which attempt to capture some of the paint overspray on disposable backdrop curtains suspended in the paint spray booths. However, the backdrop curtains utilized have presented fire hazards, have been limited in the amount of overspray they could accommodate and have presented, after only brief periods of operations, substantial resistance to the circulating air streams in the paint spray booths in which they have been suspended.

In accordance with the present invention, an improved method and apparatus are provided for removing paint overspray which avoids these aforementioned disadvantages, the present invention providing an economical and readily maintainable arrangement which requires a minimum of equipment, space and power, which minimizes fire hazards and which provides an optimum in paint overspray capacity.

Various other features of the present invention will become obvious to one skilled in the art upon reading the disclosure set forth hereinafter.

More particularly, the present invention provides a method of filtering paint overpsray from a confined air stream in which article painting operations are conducted comprising the steps of progressively removing filter medium from a supply zone into and through the confined air steam along a path downstream of the article painting operations to filter out paint overpsray from the air stream, and progressively collecting the exposed filter medium carrying paint overspray in it into a disposable package in a fire resistant, liquid bath discharge zone. In addition, the present invention provides an improved paint spray booth capable of carrying out the inventive method aforedescribed, such booth comprising a housing defining a confined zone in which article painting operations are conducted, a support means disposed within the confined zone of the housing for supporting articles to be painted, blower means to move an air stream along a path through the confined zone around the articles to be painted, and filter means downstream of the support means to filter out the paint overspray in the air stream, the filter means including an elongated integral filter medium web, a filter medium supply zone removed from the air stream path in which the web is stored, a filtering area extending transverse the air stream path into and through which the filter medium web is moved and a filter medium discharge zone removed from the airstream path to which the filter medium web is discharged to form a disposable package, means for progressively moving the filtering medium from the supply zone through the filtering area into the discharge zone, and a fire resistant liquid bath disposed in the discharge zone into which the filter medium is introduced to form such disposable package.

It is to be understood that various changes can be made in the arrangement, form and construction of the apparatus disclosed herein and in the several steps of the method disclosed herein without departing from the scope or spirit of the present invention.

Figure 2:
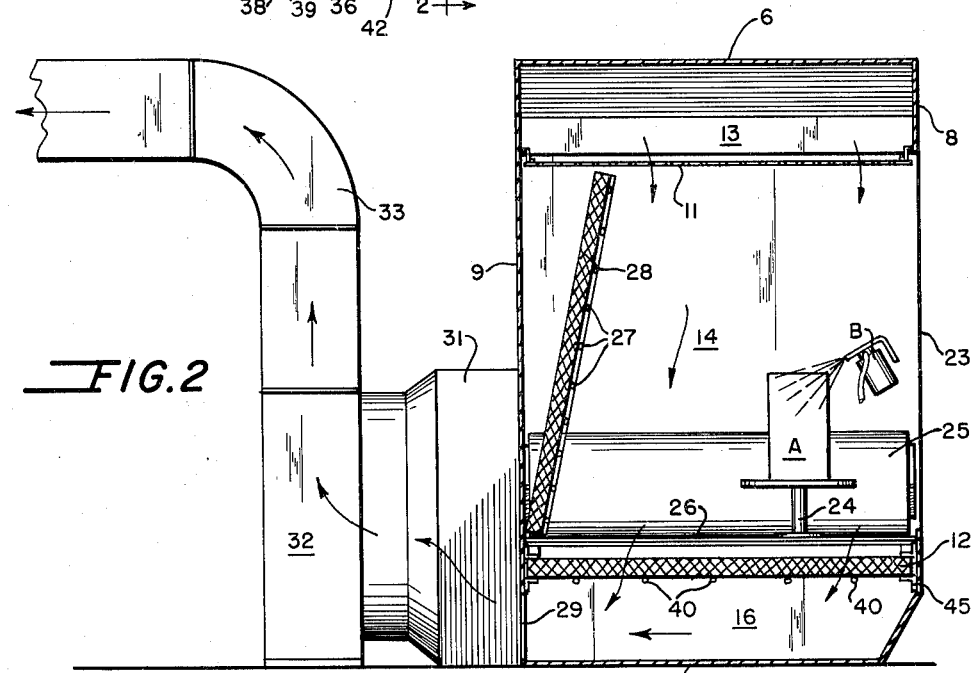

Referring to the drawings which disclose one advantageous embodiment of the present invention:

FIGURE 1 is a partially broken away, schematic front elevational view of one form of paint spray booth arrangement which incorporates the features of the present invention; and FIGURE 2 is a side elevational view of the apparatus of FIGURE 1 taken in a plane passing through line 2—2 of FIGURE 1.

As can be seen in FIGURES 1 and 2 of the drawings, the improved paint spray booth arrangement includes housing 2 having spaced vertical side walls 3 and 4, sloping roof 6, bottom wall 7, partial front wall 8, and partial rear wall 9. Housing 2 defines a substantially confined zone partitioned by means of spaced, horizontally extending, perforated splash plate 11 and filter medium web 12 (described in detail hereinafter) into upper air stream inlet plenum 13, article treating plenum 14, and air stream outlet plenum 15.

A centrifugal blower 17 driven by a suitable motor 18 through belt drive assembly 19 is positioned adjacent housing 2 to move an air stream, advantageously from an outside source (not shown in detail), through ductwork 21, into air stream inlet plenum 13. A suitable heat exchange coil 22 is arranged to extend transversely within ductwork 21 adjacent inlet plenum 13, this heat exchange coil serving to heat the air stream as it is moved into the plenum 13 to a preselected temperature in accordance with the specific requirements of the paint spray operations being conducted.

It is to be noted that housing 2 is substantially open adjacent front wall 8 so as to provide an entrance 23 for insertion of articles to be treated in article treating plenum 14. An article support platform 24 is disposed in plenum 14 on a pair of spaced support rods 26 which extend in a horizontal plane between front wall 8 and rear wall 9 immediately above filter medium web 12. Spaced from and positioned behind support platform 24 in inclined fashion is vertical grid member 27, this grid member serving to support a suitable splash pad 28 which can be made of the same material as the filter medium web 12 (described more fully hereinafter).

Communicating with air stream outlet plenum 16 through outlet passage 29 adjacent partial rear wall 9 and through transitional ductwork 31 is motor driven centrifugal blower 32. Suitable ductwork 33 is provided to extend downstream from centrifugal blower 32 to move the air stream from the centrifugal blower to outside atmosphere.

As can be seen in FIGURE 1 of the drawings, an arrangement is provided for moving filter medium web 12 from supply zone 30, into and through the air stream below article support platform 24 and into discharge zone 35. Although no conveyor belt mechanism for the filter medium web is used in the disclosed arrangement, the arrangement is in principle, like that set forth in assignee's Patent No. 2,807,330, issued to Richard D. Rivers on September 24, 1957. As such, filter medium web 12 is a long, expansible-compressible air cleaning web of a highly porous impingement nature, having an expanded operating air flow depth and being capable of being wound in compressed condition to a depth substantially smaller than its operating air flow depth to form a compressed supply roll. Advantageously, an expanded filamentous glass fiber mat or web of the type shown in assignee's Patent No. 2,798,531, issued to R. L. Jackson, Jr., on July 9, 1957, or a suitable expansible-compressible synthetic fiber mat can be used. The filter medium web 12 is supported in supply zone 30 in compressed roll form on support bracket assembly 33 which extends from wall 4. A suitable removable hood 25 is provided to protect the outer surface of the roll during paint spraying operations. Web 12 is arranged to pass from its roll form on support bracket 33 in supply zone 30 in a horizontal fashion into and through article treating plenum 14 over spaced medium support rods 40 that are positioned below support platform 24. From the article treating zone below support platform 24, web 12 passes to trough 34 in discharge zone 35 where it is connected to rewind spool 36. Spool 36 is driven through an appropriate gear drive assembly 37 by a suitable motor 38. It is to be understood that the starting and stopping of motor 38 can be conducted manually, in accordance with visual observation of web conditions, or it can be effected by a suitable differential air pressure responsive apparatus (not shown) well known in the art of air filtration. To insure that web 12 is compressed on spool 36, a spring loaded hold-down plate 39 is provided in trough 34, the free end of this hold-down device being positioned to press against the outer face of the roll of filter medium to compress the same on the rewind spool as it is rotated. It is to be noted that the trough 34 is provided with liquid inlet 41, which can be connected to a suitable water supply (not shown). Advantageously, the liquid level in trough 34 is maintained at a sufficient height to submerge the major portion of the medium on rewind spool 36, thus avoiding possible fire hazards which would otherwise prevail with a paint loaded medium. A suitable drain 42 is provided at the lower portion of trough 34 to allow drainage of the trough whenever the occasion so warrants. It is to be noted that, as web 12 passes into the article treating plenum 14 over support rods 40, the edges thereof engage between spaced seal members 45 which are fastened to and extend in a horizontal plane along walls 8 and 9 of housing 2. Thus, any bypassing of the air stream around web 12 is prevented.

Once filter medium web 12 has been completely rewound on rewind spool 36, it then can be removed from tank 34 by a suitable block and tackle arrangement, schematically disclosed by reference numeral 46, the block and tackle arrangement 46 being supported above tank 34 on a fixed traversing rail 47.

In a typical operation of the apparatus disclosed, an article A is inserted into article treating plenum 14 on support platform 24 for spraying by paint spray assembly B. During spraying operations a clean air stream is circulated by blower 17 to move through duct 21 over heating coil 22 into inlet plenum 13 and therefrom into article treating plenum 14 along side article A. Paint overspray from paint spray assembly B is picked up in the air stream and is carried or settles by gravity to filter medium web 12 which extends in a horizontal plane in expanded form below support platform 24. The overspray is filtered out from the air stream by web 12 and the air stream moves along through outlet plenum 16, transition duct 31, blower 32 and outlet duct 33. When the web 12 becomes overloaded with paint overspray—which can be visually determined or which can be determined by some suitable pressure differential mechanism positioned adjacent the web—spool 36 is driven by motor and gear assembly 37, 38 and a clean portion of web is moved from the compressed supply roll on support bracket 33 in supply zone 30 into an expanded state through article treating plenum 14 below platform 24. At the same time, the overloaded portion is moved into the liquid bath of trough 34 where it is rewound on spool 36 in compressed form, the compression being accomplished by means of the spring-loaded hold-down plate 41. Once rewind spool 36 is fully loaded, block and tackle assembly 46 is moved into position along rail 47 and the spool can be removed for appropriate disposition.

Although the present invention is disclosed in an embodiment wherein the filter medium web is moved from a supply zone in a horizontal plane into and through a filtering area downstream of the article support platform so that gravity aids in the collection of paint overspray on the filter medium web, it is to be understood that the present invention is not to be considered as limited to the arrangement disclosed. For example, an arrangement can be provided wherein the filter medium web is positioned to travel in a vertical plane across a filtering area at the downstream end of an open-ended housing, which housing serves to define the confined zone in which the article painting operations are conducted.

The invention claimed is:
1. A method of filtering paint overspray from a confined air stream in which article painting operations are conducted comprising the steps of
   (a) supporting an article for painting operations in a confined air stream path, progressively removing filter medium from a dry supply zone into and through a path extending across substantially all of said confined air stream downstream of said article painting operations and in uninterrupted communication therewith to filter out paint overspray from said air stream, and
   (b) progressively collecting the exposed filter medium, carrying paint overspray in it, into a discharge zone containing a fire resistant, liquid bath into which the medium passes for disposal.

2. A method of filtering paint overspray from a confined air stream in which article painting operations are conducted comprising the steps of
   (a) supporting an article for painting operations in a confined air stream path, progressively removing filter medium from a dry supply zone into and through a horizontal path extending across substantially all of said confined air stream downstream of and below said article painting operations in uninterrupted communication therewith to filter out paint overspray from said air stream, and
   (b) progressively collecting the exposed filter medium, carrying paint overspray in it, into a discharge zone containing a fire resistant, liquid bath into which the medium passes for disposal.

3. A method of filtering paint overspray from a confined air stream in which article painting operations are conducted comprising the steps of
   (a) supporting an article for painting operations in a confined air stream path, progressively removing and expanding an expansible-compressible filter medium from a dry supply zone where said medium is in a compressed state
   (b) moving said medium into and through a path extending across substantially all of said confined air stream downstream of said article painting operations and in uninterrupted communication therewith to filter out paint overspray from said air stream, and
   (c) progressively recompressing the exposed filter medium, carrying paint overspray in it, into a discharge zone containing a fire resistant, liquid bath into which the medium passes for disposal.

4. The method of claim 3, wherein said filter medium is moved into and through said confined air stream along a horizontal path downstream of and below said article painting operations.

5. An improved paint spray booth comprising:
   (a) a housing defining a confined zone in which article painting operations are conducted
   (b) an article support means disposed within said confined zone of said housing for supporting said articles to be painted
   (c) blower means to move an air stream along a path through said confined zone around the articles to be painted, and (d) filter means downstream of and in uninterrupted communication with said support means to filter out paint overspray in said air stream, (e) said filter means including an elongate integral filter medium web, housing structure defining a dry filter medium supply zone, removed from said air stream path in which said web is stored, a filtering area extending transverse substantially all of said air stream path, into and through which said filter medium web is moved, and housing structure defining a filter medium discharge and collection zone removed from said air stream path into which said filter medium web is discharged to form a disposable package, (f) means for progressively moving said filter medium from said housing structure defining said supply zone through said filtering area into said housing structure defining said discharge zone for collection and disposal, and (g) a fire resistant liquid bath disposed in said housing structure defining said discharge zone into which said filter medium is introduced to form a disposable package.

6. The apparatus of claim 5, wherein
(a) said filtering area of said filtering means extends in a horizontal plane below said support means.

7. The apparatus of claim 5, wherein
(a) said filter medium is of expansible-compressible material in precompressed state in said housing structure defining said supply zone, and (b) said means for moving said filter medium including means to progressively displace said precompressed filter medium in said housing structure defining said supply zone from said compressed state, through said filter area in an expanded state and into said housing structure defining discharge zone to a recompressed state.

References Cited by the Examiner

UNITED STATES PATENTS

| | | | |
|---|---|---|---|
| 1,797,248 | 3/1931 | Szegvari et al. | 55—354 X |
| 1,982,639 | 12/1934 | Christofferson | 98—115 X |
| 2,227,481 | 1/1941 | Bates | 98—115 |
| 2,232,561 | 2/1941 | Richards. | |
| 2,752,003 | 6/1952 | Hersey et al. | 98—115 |
| 2,795,288 | 6/1957 | Hirs | 55—354 X |
| 2,807,330 | 9/1957 | Rivers | 55—97 |
| 2,841,073 | 7/1958 | Forshee | 98—115 |
| 2,875,680 | 3/1959 | Forshee | 98—115 |

FOREIGN PATENTS 871,355 6/1961 Great Britain.

RICHARD D. NEVIUS, *Primary Examiner.*

JOSEPH B. SPENCER, *Examiner.*

J. P. McINTOSH, *Assistant Examiner.*